Figure 1:
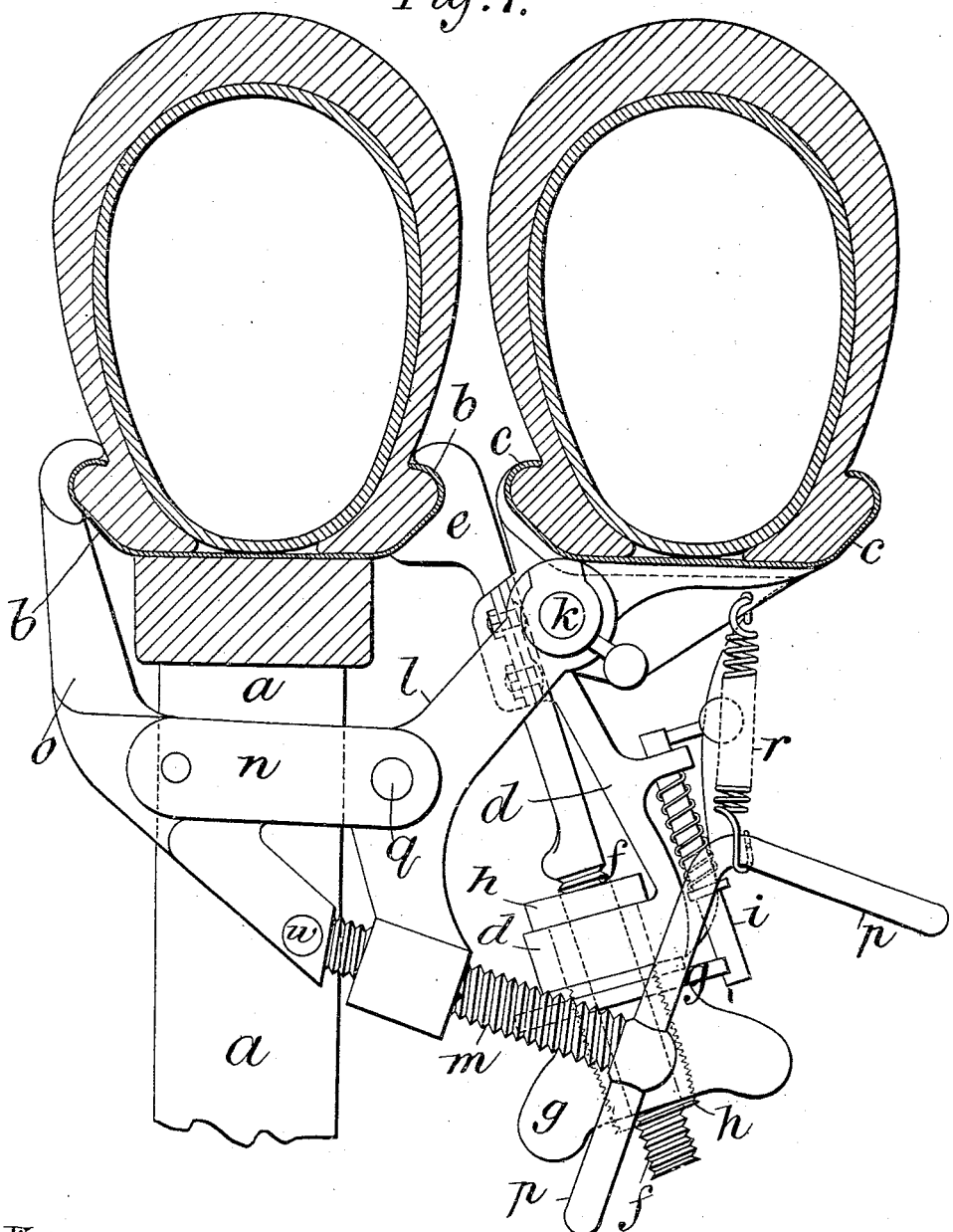

W. R. HUGHES & P. CAVE-MOYLE.
MEANS FOR SECURING A SPARE RIM TO THE WHEEL OF A VEHICLE.
APPLICATION FILED JULY 17, 1908.

946,674.

Patented Jan. 18, 1910.

2 SHEETS—SHEET 1.

Witnesses.
M. L. Adams.
C. F. Early.

Inventors.
W. R. Hughes and Philip Cave-Moyle,
By their Attorneys,
Baldwin & Wright.

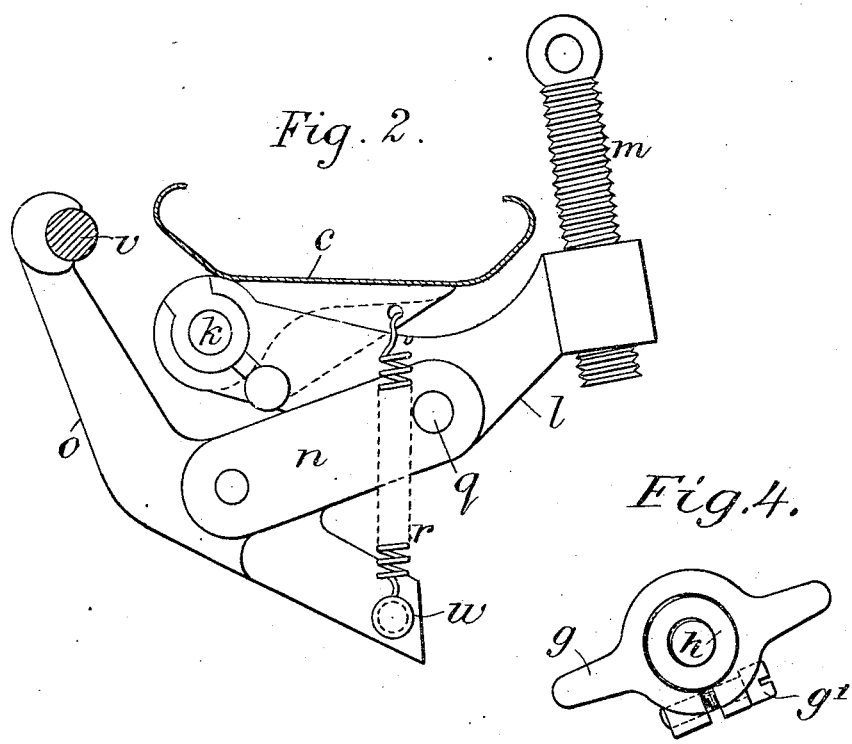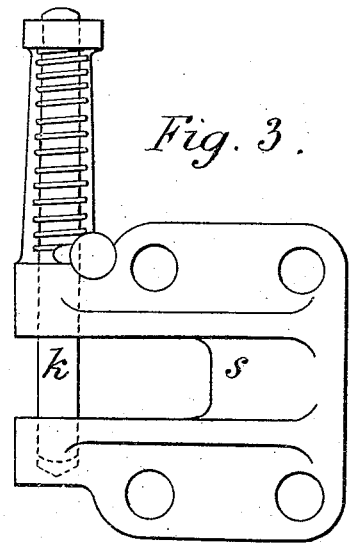

UNITED STATES PATENT OFFICE.

WILLIAM RICHARD HUGHES AND PHILIP CAVE-MOYLE, OF CHELTENHAM, ENGLAND.

MEANS FOR SECURING A SPARE RIM TO THE WHEEL OF A VEHICLE.

946,674.                    Specification of Letters Patent.    Patented Jan. 18, 1910.

Application filed July 17, 1908. Serial No. 444,055.

*To all whom it may concern:*

Be it known that we, WILLIAM RICHARD HUGHES, motor-engineer, and PHILIP CAVE-MOYLE, clerk in holy orders, subjects of the King of Great Britain, residing, respectively, at "Airedale," Victoria Terrace, and Belmont, both of Cheltenham, in the county of Gloucester, England, have invented new and useful Improved Means for Securing a Spare Rim to the Wheel of a Vehicle, of which the following is a specification.

This invention relates to improved means for securing to a vehicle wheel a spare rim or spokeless wheel carrying a fully inflated tire such as is usually known as a Stepney wheel. Such wheels have usually been held to the rim of the wheel by retainers which engaged the outer flange of such rim and hooked so far over it that they prevented movement parallel to the axis of the wheel while also taking radial strains when they were in tension. Such retainers could not be got into place until the tire on the permanent rim was deflated.

According to this invention such a rim is secured to a wheel by cramps engaging the inner side of the wheel and coöperating with retainers or clips which engage the outer flange of the rim. The cramps may engage any convenient part of the wheel for instance the inner flange of the permanent rim or a spoke and serve to prevent any movement of the spare rim parallel to the axis; they may also serve to draw the rim into place beside the wheel. The retainers or clips are formed, not with one jaw only as is usual but with two jaws so that they bear against both parts of the outside of the outer flange of the permanent rim *i. e.* against the side farther from the axle and against the side nearer the axle they are therefore capable of taking strains both in tension and also in compression. Moreover as it is not necessary that these retainers should prevent movement parallel to the axis (such movement as has already been said being prevented by the cramps) the outer jaw is not made so long as formerly and does not hook right over the outer side of the outer flange so that the retainers can easily be got into place even when the main tire is inflated. There may be any convenient number of cramps say two or more and also of retainers say four.

The accompanying drawing illustrates this invention Figure 1 being a section through part of the wheel or rim and showing both one of the cramps with its attachments and also one of the retainers. Fig. 2 is a section through the spare rim showing the cramp with its attachments folded back in the position they occupy before the spare rim is brought into use. Fig. 3 shows a means for securing the cramp to the Stepney wheel and Fig. 4 shows a detail.

$a$ is one of the spokes of the main wheel and $b$ its rim.

$c$ is the spare rim or Stepney wheel on which are say four brackets $d$. Each bracket carries a retainer $e$ provided with an outer jaw adapted to engage that part of the outside of the outer flange of the rim $b$ which is farther from the axle and also an inner jaw adapted to engage that part of the outside of the outer flange which is nearer the axle; the retainer can thus take radial strains both in compression and tension. In order that the retainer may be adjusted it has a screw threaded stem $f$ as usual and since it is now necessary to prevent movement of the stem toward the axle as well as away from the axle, the nut engaging the stem is caused to bear on the bracket $d$ in both directions. For this purpose the nut is made in two parts one part $h$ into which the stem screws passing through a hole in the bracket and itself screwing into the part $g$ which may be split and clamped on the part $h$ by the screw $g'$.

$i$ is a spring bolt which engages the nut $g$ and so prevents rotation thereof.

We will now describe the method of attaching the cramps.

Pivoted at $k$ to the spare rim $c$ is a bent lever $l$ the end of which is formed as a nut in which works a screw $m$. Pivoted to the lever $l$ at $q$ is a link $n$ the other end of which is pivoted to the cramp $o$ the one end of which is designed to hook over the inner flange of the permanent rim $b$ while the other end bears against the end of the screw $m$ which can be screwed through the nut on the lever $l$ by means of the handle $p$. It will be seen that the rim $c$ being placed beside the wheel and the cramps being placed in the position shown in Fig. 1, on turning the screw $m$ this screw bearing against the end of the cramp $o$ will cause the lever $l$ to turn about pivot $q$ of the link $n$ and will thus force the rim $c$ toward the wheel thus causing the retainer $e$ to push aside the tire in the rim $b$ and to engage the flange of that rim as shown in Fig. 1.

$r$ is a spring adapted to engage the handle $p$ and keep it from moving.

When the Stepney wheel is not in use it may be supported on a ring $v$ by the cramps $o$ and some of the parts may then be folded back as seen in Fig. 2 (from which the tire retainer and bracket are omitted). The spring $r$ may be used to hold the parts in this position by hooking it onto a stud $w$ provided on the cramp for this purpose.

The levers $l$ may be permanently pivoted to the rim $c$ or if it be preferred they may be detachably connected to the rim for instance by means of the bracket $s$ (shown in Fig. 3) which is riveted to the rim and carries a pivot pin $k$ which slides through ears on the bracket.

What we claim is:—

1. In means for securing a spare rim to the wheel of a vehicle the combination of a retainer carried by the rim and adapted to engage the outer flange of the permanent rim, and prevent radial movement of the spare rim, a cramp adapted to engage the inner side of the wheel and to prevent axial movement of the spare rim, and a lever pivoted to the spare rim and also to the cramp.

2. In means for securing a spare rim to the wheel of a vehicle the combination of a retainer carried by the rim and adapted to engage both parts of the outside of the outer flange of the permanent rim, a cramp adapted to engage the inner side of the wheel and a lever pivoted to the spare rim and also to the cramp.

3. In means for securing a spare rim to the wheel of a vehicle the combination of a retainer carried by the rim and adapted to engage the outer flange of the permanent rim, a cramp adapted to engage the inner side of the wheel, a lever pivoted to the spare rim and also to the cramp, a nut formed upon the end of the lever and a screw working in the nut and bearing against the cramp.

WILLIAM RICHARD HUGHES.
PHILIP CAVE-MOYLE.

Witnesses:
JOHN HENDERSON WHITEHEAD,
HERON J. W. LAING.